United States Patent [19]

Ravizza

[11] Patent Number: 4,751,375
[45] Date of Patent: Jun. 14, 1988

[54] METHOD AND APPARATUS FOR READING BAR CODE UNDER RAPIDLY CHANGING SCANNING SPEED CONDITIONS

[75] Inventor: Raymond F. Ravizza, Cupertino, Calif.

[73] Assignee: Ampex Corporation, Redwood City, Calif.

[21] Appl. No.: 851,062

[22] Filed: Apr. 11, 1986

[51] Int. Cl.[4] .............................................. G06R 7/10
[52] U.S. Cl. .................................... 235/472; 235/474
[58] Field of Search ................................ 235/472, 474

[56] References Cited

U.S. PATENT DOCUMENTS 3,991,299 11/1976 Chapima .................... 235/472 X
4,251,798 2/1981 Swartz .......................... 235/472
4,554,445 11/1985 Chasse .......................... 235/472

Primary Examiner—Harold I. Pitt
Attorney, Agent, or Firm—George B. Almeida; Richard P. Lange; Joel D. Talcott

[57] ABSTRACT

A bar code reader system includes a stream of pulses whose period is a function of the scan speed of the reader as it scans the bars and spaces of a bar code symbol. Transition pulses are supplied which identify the boundaries of the bars and spaces. The tach pulses which occur between transition pulses are counted, loaded into memory, and are read from memory via microprocessor means, whereby the widths of the bars and spaces are determined. The sequence of the bar and space data is decoded to yield the bar code encoded numbers.

38 Claims, 10 Drawing Sheets

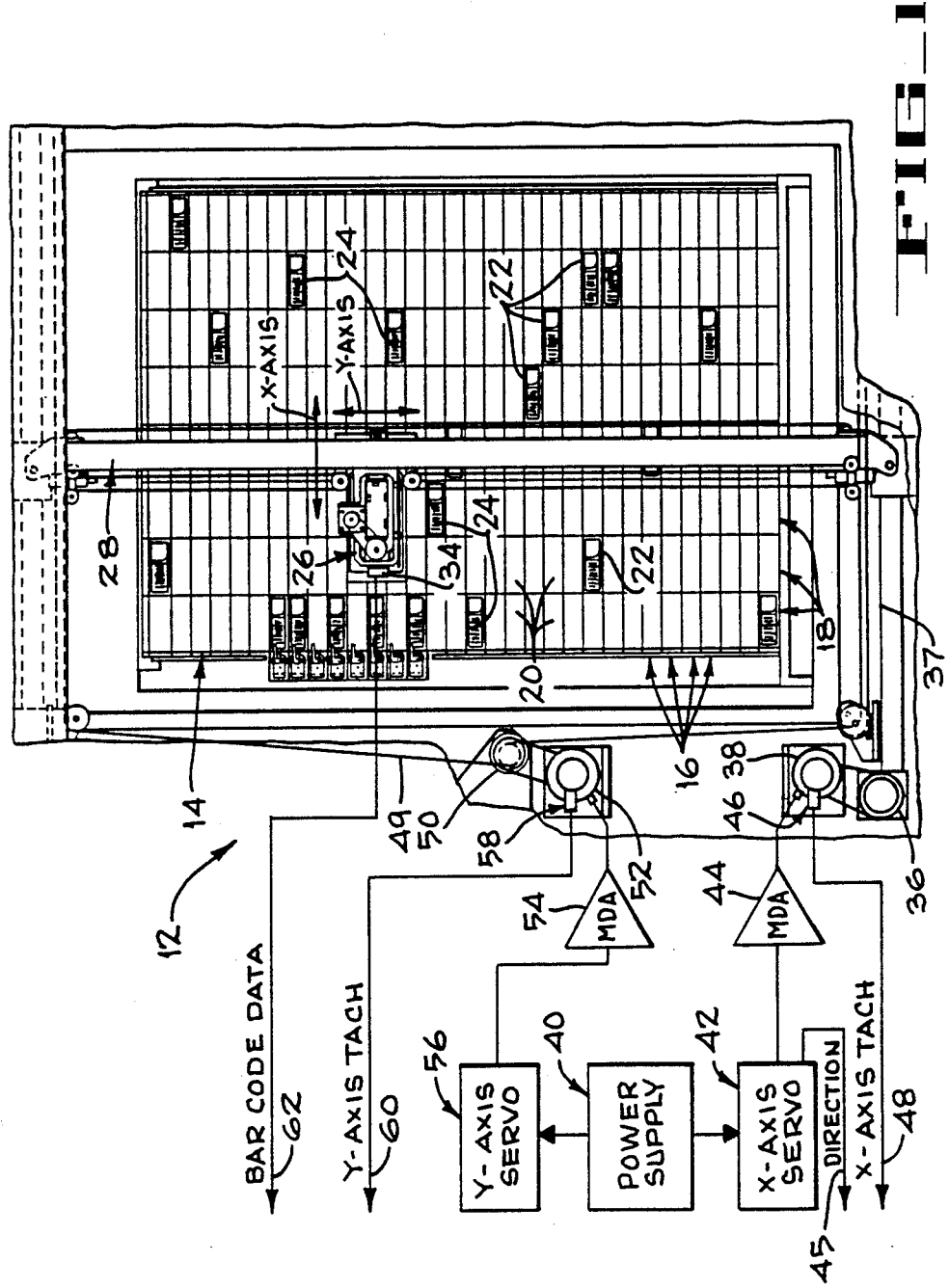

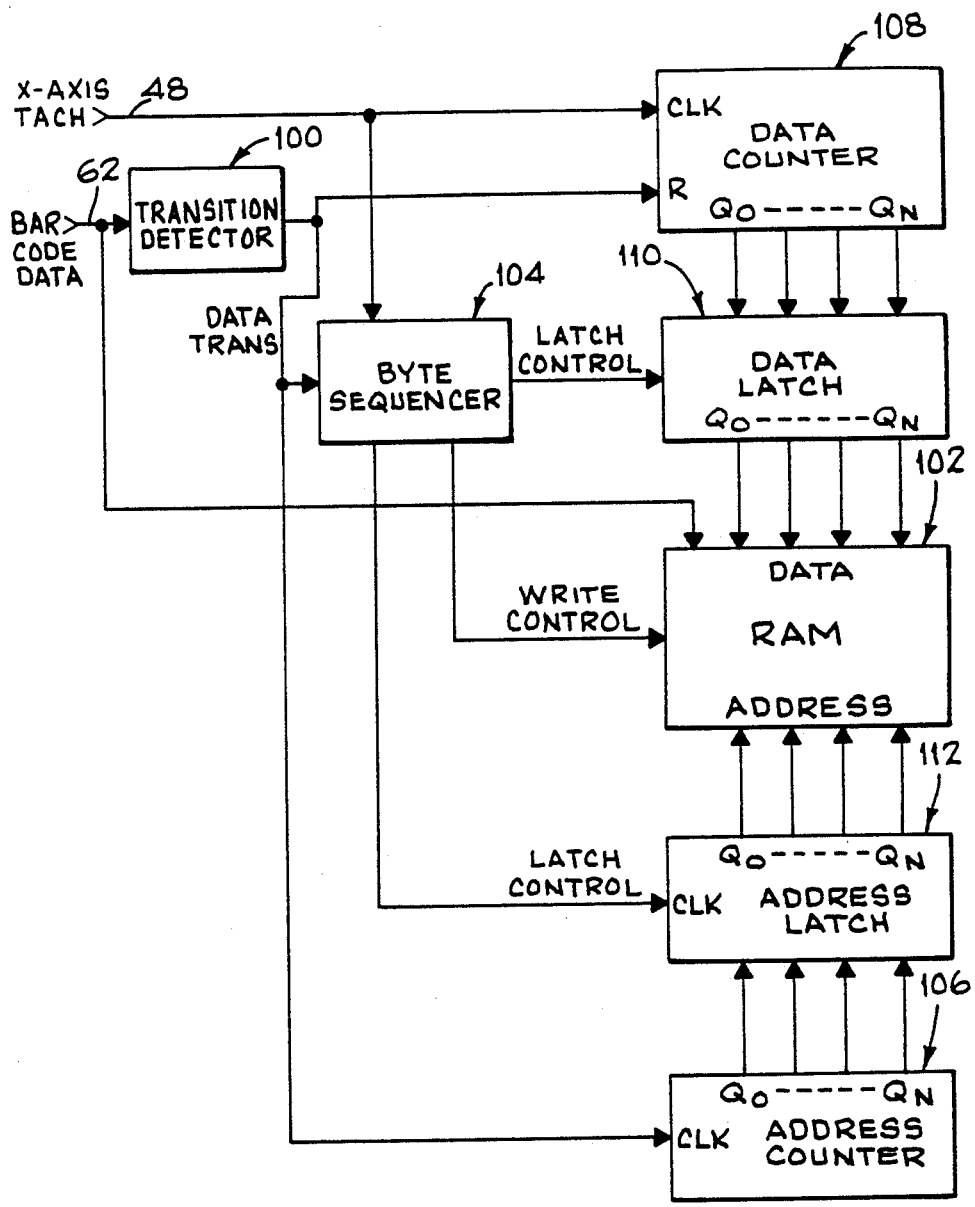
FIG_2

(A) ENCODED DATA ON LABEL 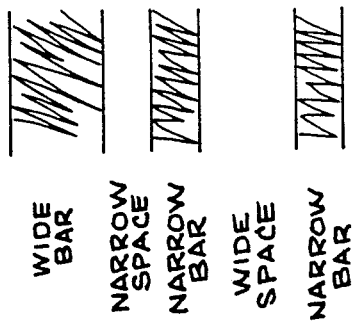
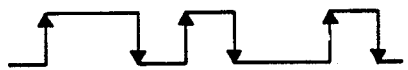
(B) BAR CODE DATA
(C) TRANS DETECTOR OUTPUT 
(D) X-AXIS TACH 
FIG_3

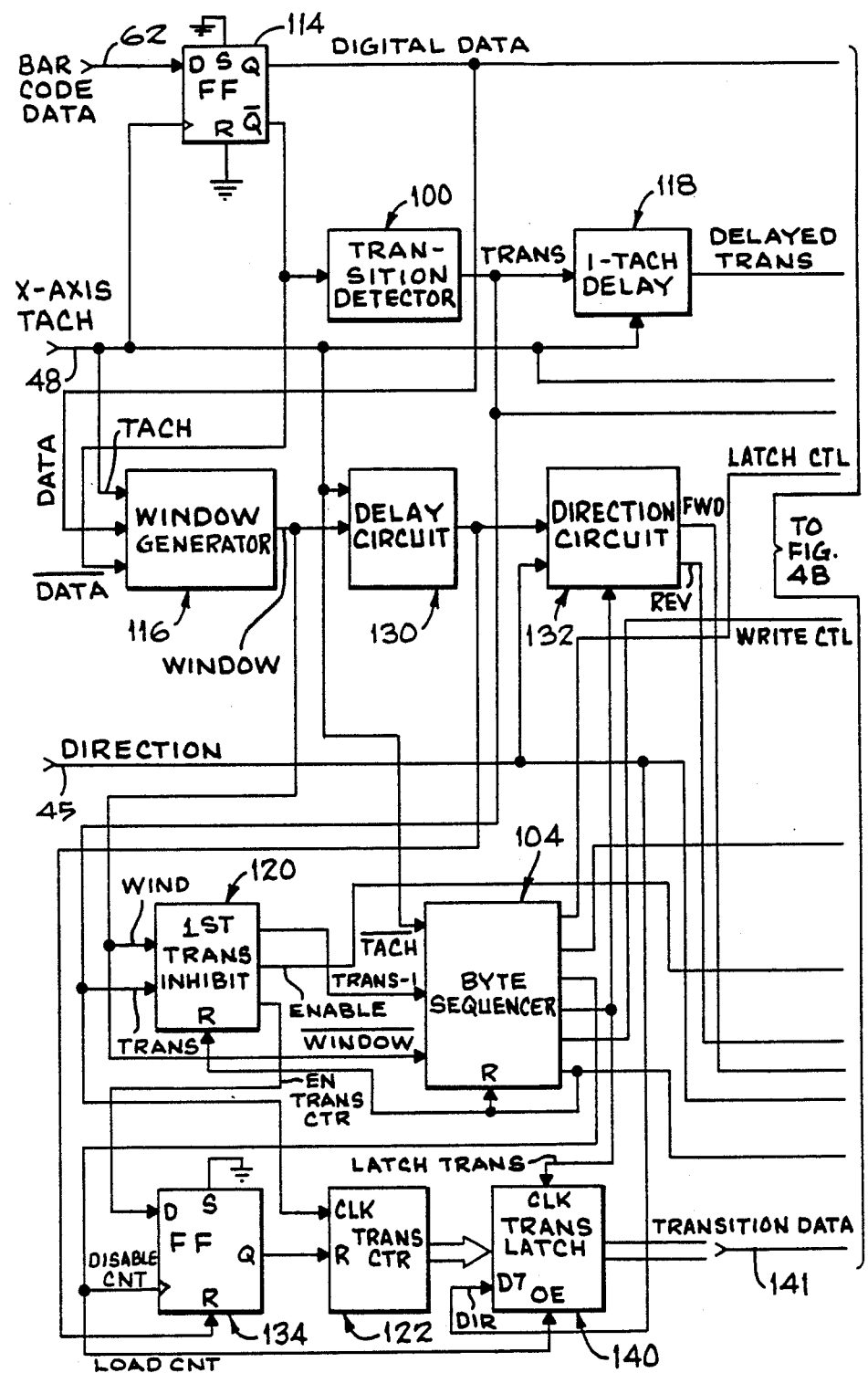
FIG_4A

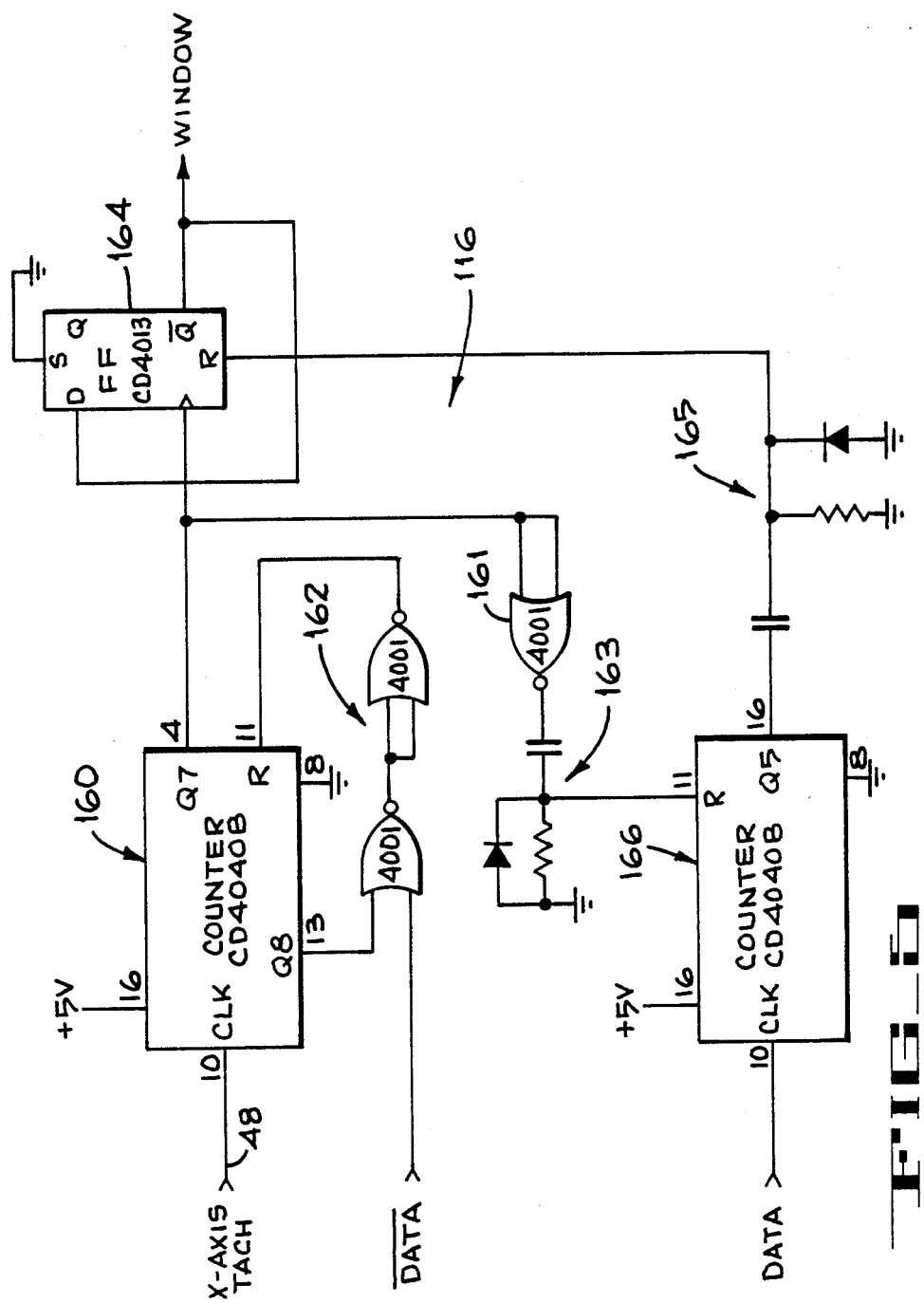

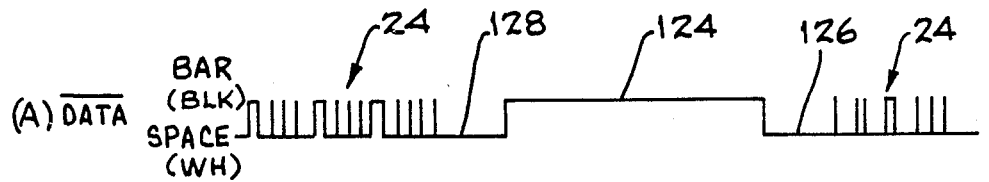
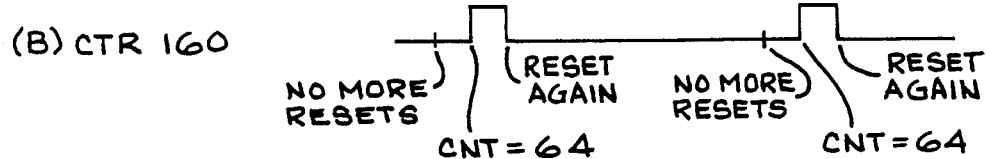
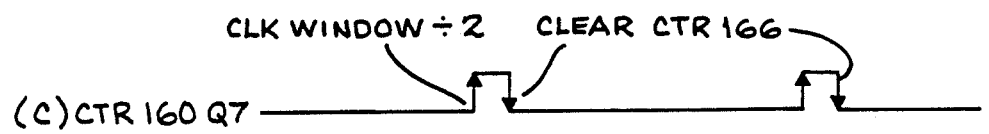
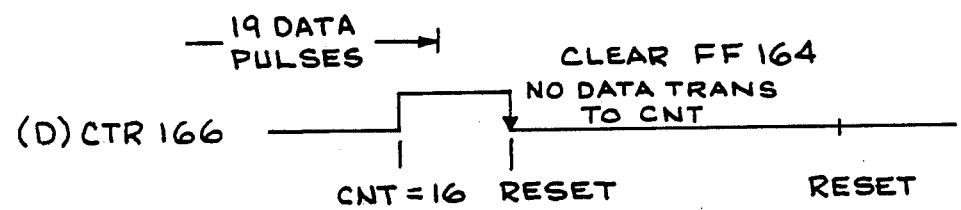
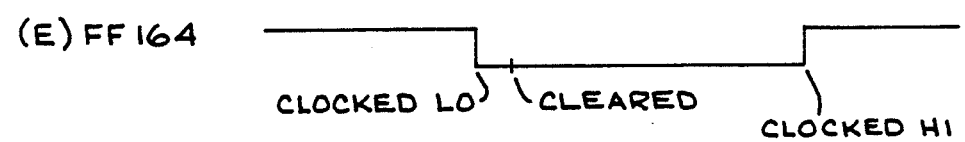
FIG_6

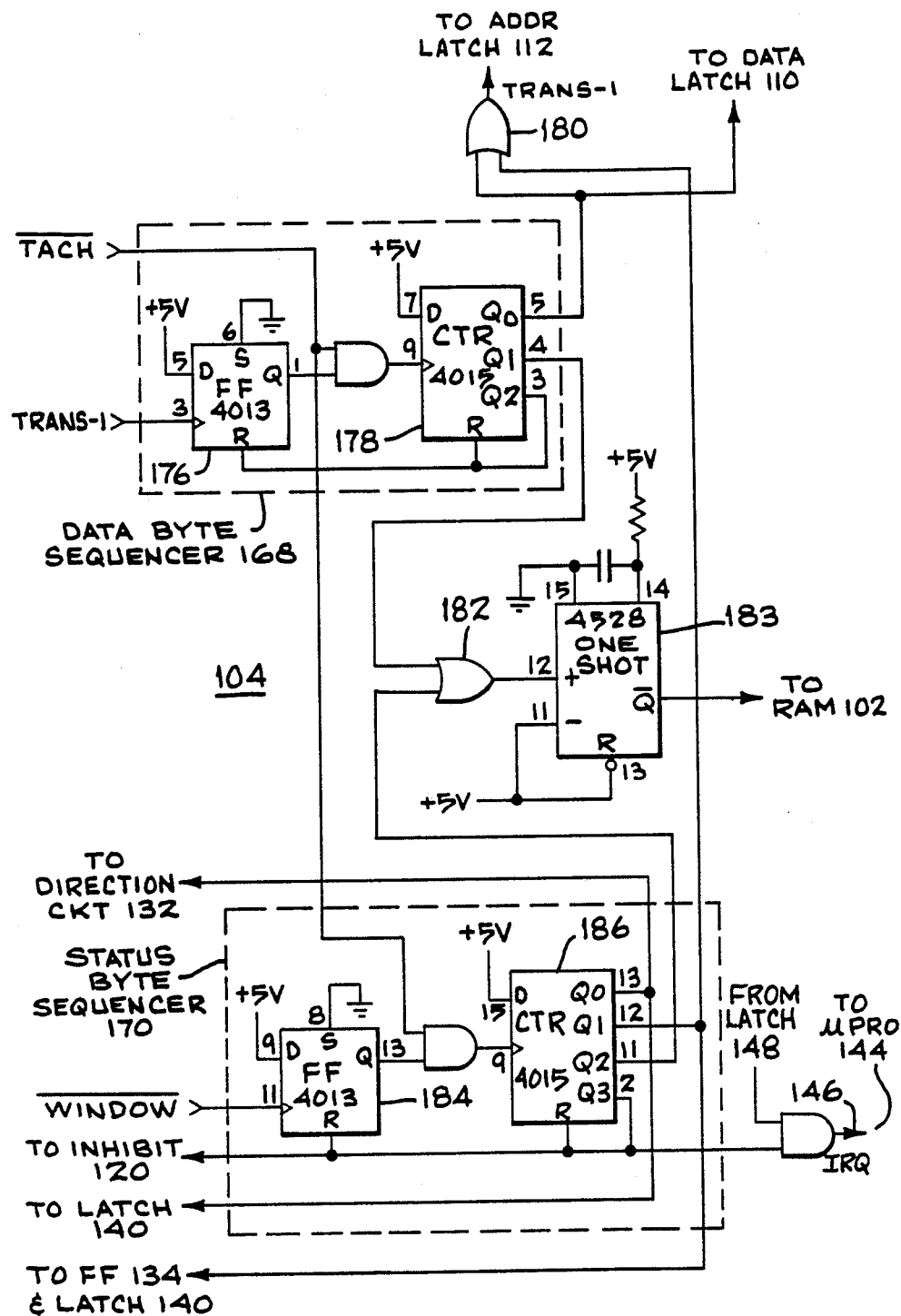
FIG_7

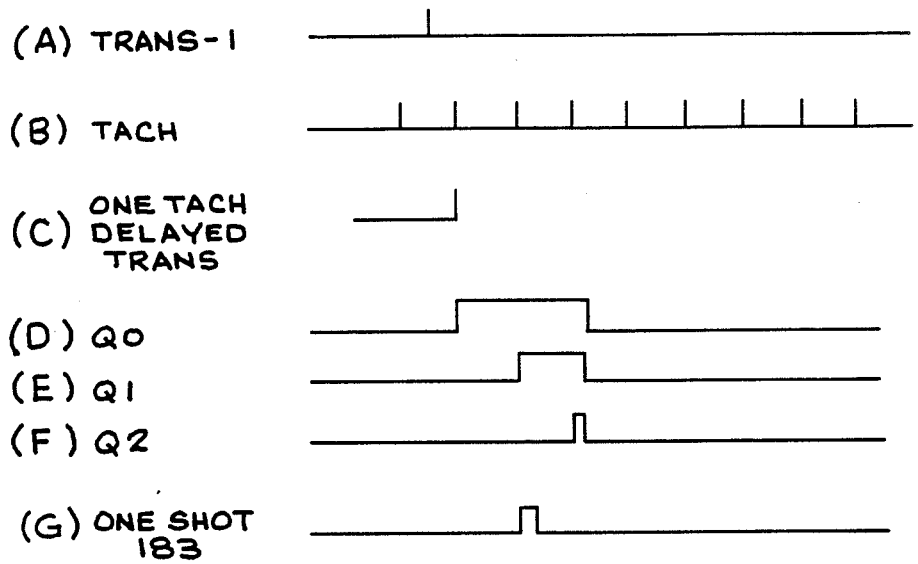
FIG_8
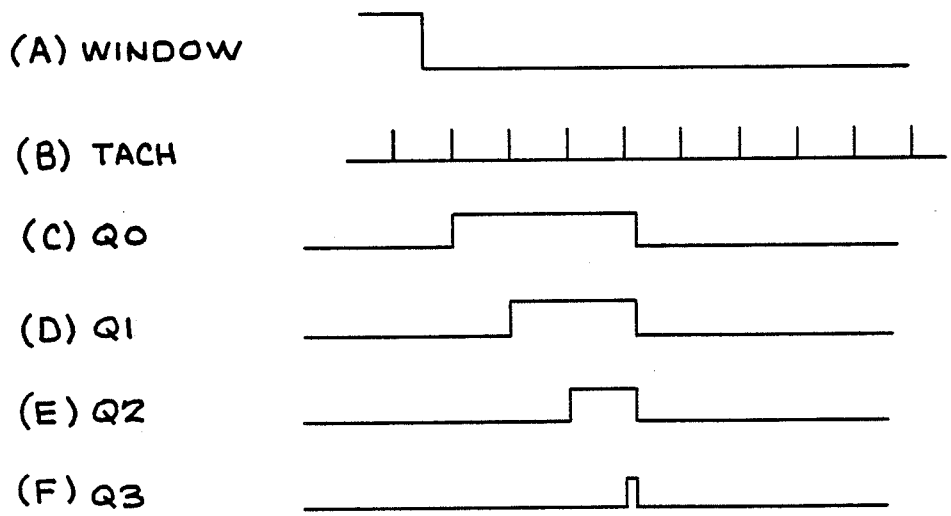
FIG_9

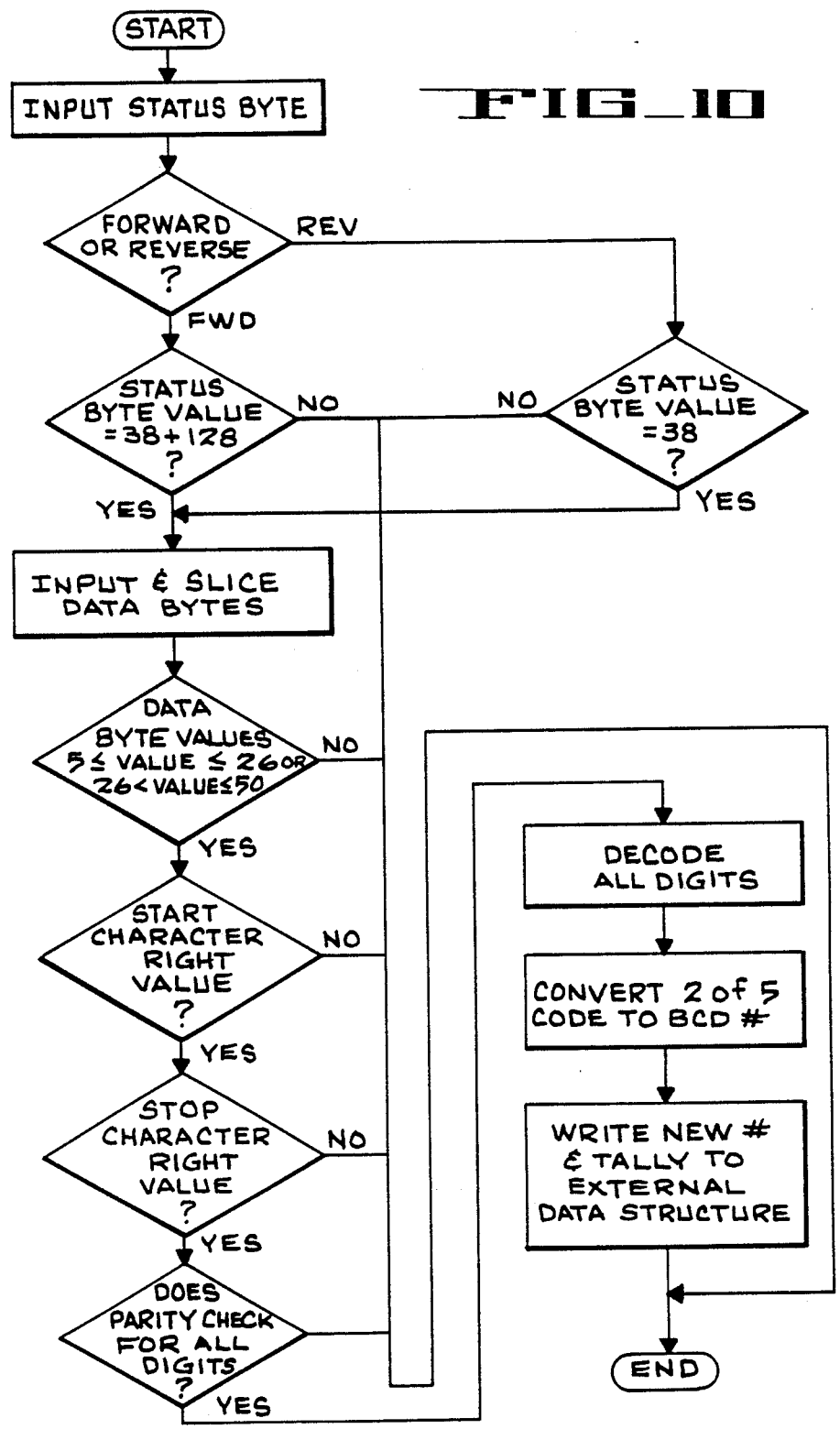

METHOD AND APPARATUS FOR READING BAR CODE UNDER RAPIDLY CHANGING SCANNING SPEED CONDITIONS

BACKGROUND AND SUMMARY OF THE INVENTION

The invention relates to bar code readers and, in particular, to a bar code reading system for reliably reading bar code information in situations where the reading speed is changing rapidly.

The use of scanning techniques to retrieve information from machine-readable labels, badges, documents, etc., is gaining acceptance in a wide variety of applications due to the fact that bar codes are well suited for a variety of data entry, identification, and programming needs. It follows that bar code systems using optical scanning techniques increasingly are filling the need for fast, accurate data entry. The ready availability of microprocessors and associated systems for processing data simplifies the task of decoding information presented in bar code format, and in preparing it for transmission to associated data utilization devices. In addition, very accurate bar code systems are available which find use in apparatus wherein a corresponding high accuracy is required in the identification of items upon which the bar code is printed. The most common type of data stored in bar code is thus item identification information used for inventory control, work-in-progress tracking, distribution tracking, and other material management functions. In these applications, the bar code symbol may represent a product number, serial number, or an alphanumeric description of the item.

Basically, bar code data are stored as a series of bars and spaces which are printed on a medium, wherein the bar code is scanned by moving a small spot of light across the bars and spaces with a smooth, continuous (that is, constant) scanning motion. The output of the scanner is determined by the difference in the reflectivity of the bars and spaces. The data stored in the bar code symbol are retrieved by the movement of the spot of the optical scanner across the symbol, or vice versa.

In general, scanners are categorized as either stationary scanners, or movable scanners which include hand-held and machine-held scanners. In the movable scanners, the relative movement of the scanner and symbol can be accomplished manually as by a human operator moving a hand-held wand or automatically, as in a conveyor system which moves the symbol past a fixed beam of light, in a light beam system which scans a symbol via a scanning light beam, or in a machine-held wand system wherein the machine mechanically moves the wand past the symbol. In all such scanning systems, a substantially smooth and constant scanning speed is required in order to read the bar code symbol reliably. Once the data have been retrieved as a relatively constant serial stream of data pulses, it is translated by a decoder into computer readable data, is error-checked, and is transmitted to the host computer system for subsequent use.

Typically, bar code reader systems convert wide and narrow bar (and space) information into time information in the digital domain, wherein the bar code information is scanned with a smooth continuous motion. However, this approach does not yield reliable reading when the scanning speed is rapidly changing, since the speed changes add large time variations to the assigned time periods which identify wide bars and spaces and narrow bars and spaces, thus masking the true time lengths of the bars and spaces along the direction of scan movement. Thus, for example, if the scanner is traveling at a subnominal speed, a narrow bar readily may be detected as a wide bar, while at a supernominal speed a wide bar readily may be detected as a narrow bar. It follows that in, for example, present hand-held wand types of systems, the operator must be trained to use a substantially smooth, continuous motion when scanning the bar code information, or invalid data will be produced in the readout of the symbol. Likewise, present machine-held wand systems and optical light beam scan systems also are driven at a substantially smooth, continuous scanning speed to insure reliably reading the symbol.

However, there are applications, employing for example a machine-held movable wand, wherein it is desirable for the reader scanning mechanism to rapidly accelerate from stop to high speed, and/or rapidly decelerate from a high speed to stop, while attempting to scan bar code information. It follows that in such systems, the bar code reading mechanism is not traveling with the smooth, continuous motion heretofore required by present bar code reader systems, whereby the rapidly changing scanning speeds result in an unreliable readout of the bar code information.

Accordingly, it would be highly desirable to provide a bar code reader system which reliably reads bar code information regardless of changes in the scanning speed during the read out process.

The invention overcomes the disadvantages of the present bar code readers discussed above, by providing a bar code reading technique capable of reliably retrieving bar code information while scanning a bar code symbol at rapidly changing speeds, or at different constant speeds. To this end, the invention provides a system for removing the time element from the bar code data read out technique, whereby the widths of the bars and spaces are represented by the number of tach pulses accumulated between their successive boundaries, that is, during each data cell defined by the transitions. Thus, in the invention, a bar or space is a dimension or distance being measured, and the period of the tach pulses defines the unit of measurement distance used to measure the bar or space dimension, wherein the period between tach pulses changes inversely with the scanning speed, that is, is an inverse function of the rate of scanning. It follows that the time dimension is removed from the read process by counting the number of tach pulses which occur between bar transitions.

Accordingly, a tach generator supplies a stream of pulses which are indicative of the speed of the bar code reader as it scans a bar code symbol in a scan direction. The data signal from the bar code reader is supplied to a transition detector which supplies transition pulses for each boundary between a bar and a space, and a space and a bar, of the symbol. A data counter counts the stream of pulses which occur between successive transitions and provides an accumulated count for each data cell. By way of example, a wide bar or space herein may be represented by 30 tach pulses, while a narrow bar or space may be represented by a relatively smaller number of 10 tach pulses. The successive counts representing the data cell widths are loaded into respective address locations in memory until data for an entire symbol is in memory. The data is read from memory by microprocessor control and a determination is made whether a data cell is wide or narrow by making a comparison of the counts with respective preset count values. The complete sequence of the bar and space data of each symbol then is decoded by the microprocessor to yield the bar code encoded numbers contained in the symbols.

As further discussed below, the stream of pulses may be supplied by devices other than a tachometer, and may include devices such as odometer devices which generate pulses at a rate indicative of their movement across a medium. Likewise, in bar code formats, information may be contained in bars only, in spaces only, or in both bars and spaces. Thus the terms bars and spaces are used equivalently herein. In addition, a given bar code encoding technique may not provide readily identifiable transitions at the boundaries of each data cell, i.e., bar or space, but may provide boundaries at other sub-portions of the bar code symbol. The invention contemplates use with the latter encoding techniques as well, as described below. Still further, the invention technique contemplates use in a software environment, as well as in the hardware environment in which is it described herein by way of example only.

BRIEF DESCRIPTION OF THE DRAWINGS

FIG. 1 is a block diagram depicting a multiple-cassette X,Y bin array as used in an automated, multiple cassette player apparatus in which the invention bar code reading technique may be used, and includes an X,Y axes cassette picker assembly and associated X,Y picker FIG. 2 is a block diagram of the invention, as depicted herein with the apparatus of FIG. 1 by way of example only.

FIGS. 3A-3D are a graph showing a portion of encoded bar code data and related signal waveforms.

FIGS. 4A, 4B are a block diagram depicting in further detail tne block diagram of FIG. 2.

FIG. 5 is a schematic diagram of the window detector circuit of FIG. 4A.

FIGS. 6A-6E are a graph showing the end and beginning of successive bar code symbols, the respective stop and start margins and the associated window generating signals FIG. 7 is a schematic diagram of the byte sequencer circuit of FIG. 4A.

FIGS. 8A-8G are a graph depicting the data byte sequence controller timing.

FIGS. 9A-9F are a graph depicting the status byte write sequencer timing.

FIG. 10 is a flow chart of the decode function of the microprocessor of FIG. 4B.

DESCRIPTION OF THE PREFERRED EMBODIMENTS

Figure 4B:
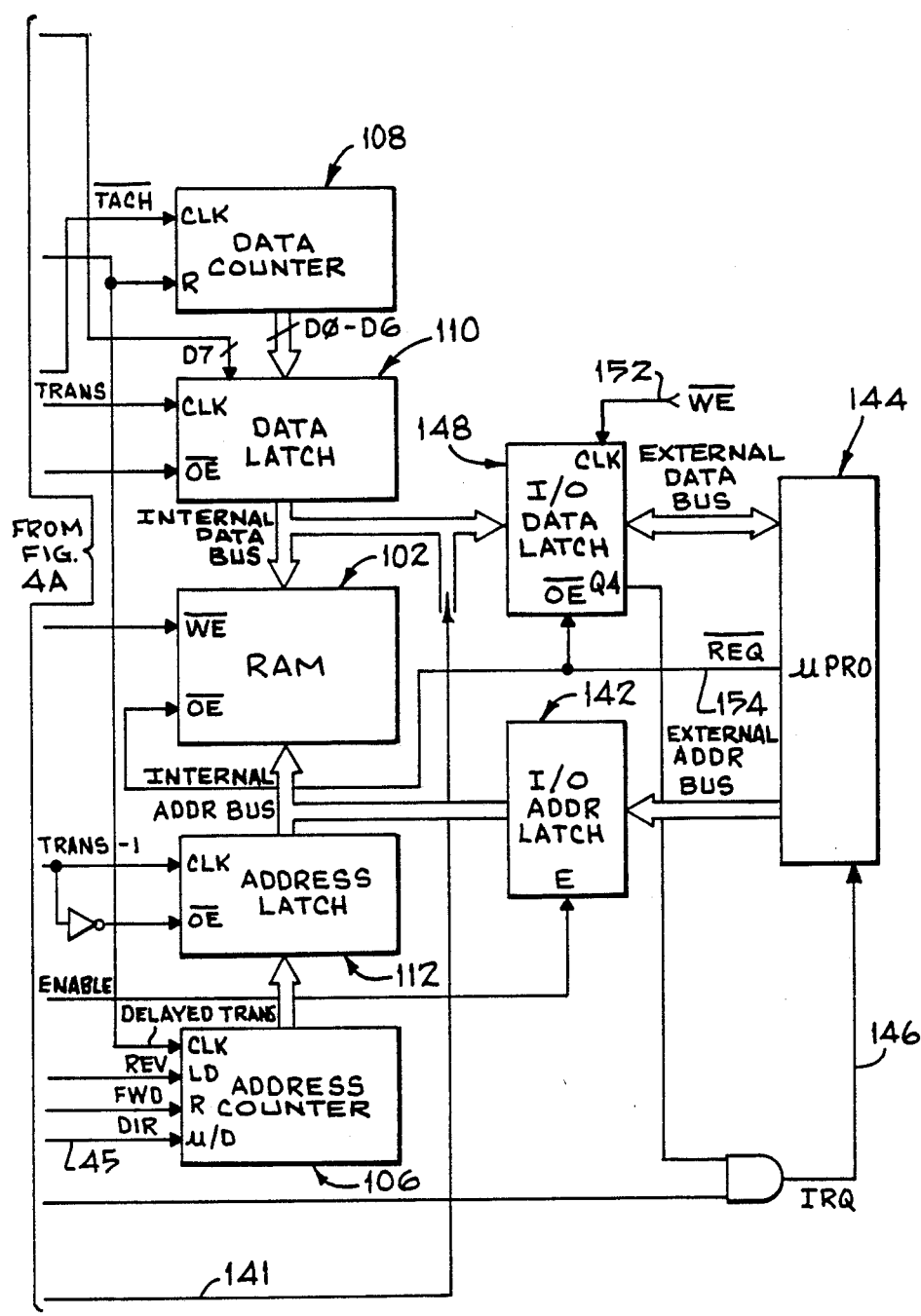

By way of further description of conventional bar code systems, the complete bar code symbol consists of start and stop margins, start and stop character patterns, the data or message characters, and an optional checksum character. The start and stop margins are void of printed characters or bar information, for example, may be an all white area much longer than a wide space, which normally instruct the bar code decoder that the scanner is about to encounter, or has just finished scanning, a bar code symbol. The start character, which precedes the first character of the bar code message, is a special bar/space pattern used to identify the beginning of a bar code symbol. The stop character is also a special bar/space pattern whose purpose is to signal the end of the symbol. The bar/space patterns used to encode the start and stop characters generally do not have a start-to-stop symmetry in order to allow the start and stop characters to be used interchangeably, because the decode process is able to differentiate between scanning in the forward and reverse directions. Thus, start and stop characters allow bi-directional scanning of a symbol.

The data or message characters define the general structure of the bar code symbol and are implemented differently in each of the various bar codes which have been developed in the industry. The various symbologies available are categorized according to the encoding technique used, the character set available (numeric or alphanumeric), and the information density at a specific module width. Thus, for example, the following TABLE 1 presents a number of popular bar codes and lists them in terms of encoding technique used and the data encoded. The two encoding techniques specified are module width encoding and NRZ (non-return-to-zero) encoding. Module width encoding is used in most industrial bar codes, whereas commercial bar codes commonly use NRZ encoding.

TABLE 1

| Type | | Numeric | Alpha-numeric |
|---|---|---|---|
| Module Width Encoded | 3 of 9 Code | | X |
| | Industrial 2 of 5 Code | X | |
| | Interleaved 2 of 5 Code | X | |
| | Matrix 2 of 5 Code | X | |
| | Codabar Code | X | |
| | Code 11 | X | |
| NRZ Encoded | UPC A, B, C, D, E, | X | |
| | EAN 8,13 | X | |

The technique used to represent binary data differs between module width encoding and NRZ encoding. In module width encoding, a narrow element (bar or space) represents data whose logic value is zero. Data with a logic value of one is printed as a wide element whose width is typically two to three times that of a narrow element. Thus there are definite printing transitions from black-to-white or white-to-black separating each binary data cell from its neighbor. On the other hand, the NRZ encoding technique encodes binary data in the related reflectivity of the bars and spaces. Here the logic zero data is presented as a reflective surface and the logic one data is presented as a non-reflective surface. There is no printing transition between bits unless the logic state changes.

By way of further background, each data character in a 2 of 5 code family shown in TABLE 1 contains two wide elements per five-element character (hence the name 2 of 5). The code uses black bars and white spaces with numeric character sets (0–9) and with binary encoding of a one for wide, and a zero for narrow, elements. Inter-character narrow spaces separate the characters in a non-interleaved code, whereas in the interleaved code the inter-character spaces are eliminated. As previously mentioned, there are definite printing transitions at the boundaries of bars and spaces in the module width encoding technique. However, in the NRZ encoding technique, there is no printing transition between elements, or data cells, in a character unless there is a logic change. In these techniques, there are inter-character spaces which do however, supply definite transitions. Accordingly, the character distances are detectable by the invention technique herein as an inverse function of the scanning speed in the same manner as are the data cell lengths of the module width encoding technique described herein by way of example. The data elements within the characters of an NRZ encoding technique then may be detected within the character. Thus, the invention contemplates the representation of data cells, characters and/or the bar code symbol boundaries of module width encoding or NRZ encoding techniques by the number of pulses counted between discernible transitions, wherein the period of the pulses defines the unit of measurement distance that is an inverse function of the scanning speed and which is used to measure the widths of the data cells in the scanning direction.

By way of example only, the invention is illustrated herein in the environment of an automated, multiple cassette, video tape player and provides identification of a possible 256 video cassettes on which are recorded, for example, advertising material, etc., commonly aired by broadcast studios. It is to be understood that although the invention is described in conjunction with such video broadcast apparatus and a specific type of tachometer system for determining the rate of movement of the optical scanner device, it contemplates use with any of the available bar codes employing module width or NRZ encoding, exemplified in the TABLE 1 above, and with any of the aforementioned stationary and/or movable optical scanner systems. To simplify the description herein, the invention further is described in the environment of the interleaved 2 of 5 code, module width encoded type of bar code technique, although it may be used with the other bar code techniques.

FIG. 1 illustrates an electromechanical apparatus in which the invention bar code reader is used and particularly a multiple cassette video tape player apparatus 12 for automatically retrieving and playing back cassettes stored in a multiple cassette bin array 14 thereof. The bin array 14 is termed an X,Y bin array and comprises X-axis rows 16 and Y-axis columns 18 of bins 20, for retrievably storing respective video cassettes 22. Each cassette has an identification bar code symbol 24 secured to an exposed end thereof in the form of a preprinted bar code label or sticker.

An X,Y cassette picker assembly includes a cassette picker 26 translatably mounted on a vertical member 28, wherein the cassette picker 26 slides vertically on the member 28 for controlled Y-axis movement of the cassette picker by suitable drive means. The cassette picker 26 and the supporting vertical member 28 are translatably supported for independently controlled X-axis movement thereof by suitable drive means. Thus, the cassette picker 26 may be moved in an X-axis direction along a single row of bins by moving the member 28 in a horizontal direction, or may be driven to a specific bin of the array 14 by simultaneous movements of the cassette picker 26 in both the X and Y axes directions.

An optical bar code reader 34 is mounted to the cassette picker 26 and includes, for example, the non-contacting light pen wand of previous mention, disposed to scan the bar code symbols of a single cassette, or a row of successive cassettes, in the X-axis direction. The vertical member 28, and thus the cassette picker 26 and integral bar code reader 34, are moved horizontally in either direction along the X-axis by suitable means, which herein are exemplified as a drum 36 for imparting movement to a cable 37 wrapped about its grooved circumference, wherein the cable 37 is coupled at either end to the ends of the vertical member 28 via pulleys (not shown) attached to the bin support. The drum 36 is mechanically coupled to a shaft of a drive motor 38 which, in turn, is driven by a motor drive amplifier (MDA) 44 coupled to a suitable power supply 40 via an X-axis servo circuit 42. In addition to performing the usual servoing functions, the X-axis servo supplies a logic level direction signal on a line 45 which also is used by the reader circuit of FIG. 4 to indicate the direction of scanning movement. A tachometer 46 is coupled to the motor 38 and supplies via an X-axis tach line 48, a corresponding stream of X-axis tach pulses indicative of the motor rotation and thus of the rate of movement of the bar code reader 34 in the X-axis direction. In accordance with the invention, the period between tach pulses defines thus a unit of measurement distance that is the inverse function of the rate of scan. A typical high resolution tach 46 may supply on the order of 2000 tach pulses per revolution of the motor.

The cassette picker 26/bar code reader 34 assembly is moved up or down in the vertical direction by suitable means such as previously described, which includes a cable 49 wrapped about a drum 50 and coupled at either end to the cassette picker 26. A motor 52 rotates the drum in response to a MDA 54, a Y-axis servo circuit 56 and the power supply 40. A Y-axis tach 58 is coupled to the motor 52 and supplies, via a Y-axis tach line 60, a stream of Y-axis tach pulses indicative of the movement of the picker 26 in the Y-axis direction. Since the bar code reader 34 herein reads the bar code symbols while scanning bi-directionally along the X-axis, and not while moving in the Y-axis direction, it is the X-axis tach 46 and associated components that are pertinent to the invention description. Obviously, if the cassettes are vertically oriented the symbols may be scanned in the Y-axis direction and the Y-axis tach 46 would supply the rate of movement information.

The bar code data encoded in the symbols of each cassette are read by the bar code reader 34 and supplied on a bar code data line 62 as a waveform of wide and narrow pulses corresponding to the respective widths of the bars and spaces of each bar code symbol. Once the cassettes are identified and assigned to respective bins, their location may be confirmed by scanning the bar code reader 34 past the cassettes being checked, and reading their respective bar code symbols. Since speed of operation is crucial, and since the picker 26 and thus the reader 34 must move from zero to very high speeds, for example, 100 inches per second (ips), the reader 34 is being moved at a rapidly changing speed within the range of zero to 100 ips, as it passes the various cassettes.

The present bar code reader provides reliable read out of the symbols by removing the time element from the read out technique. To this end, the X-axis tach pulse rate is a function of the speed of the bar code reader 34, and the widths of the bars and spaces, i.e., the distances being measured thus are differentiated by how many tach pulses occur when the reader 34 scans across a wide bar or space relative to when it scans across a narrow bar or space. Accordingly the time dimension is removed from the read out process.

To this end, FIG. 2 illustrates the concept of the invention wherein the data signal on the line 62 and the X-axis tach on the line 48 of FIG. 1 are supplied as corresponding input signals to the circuit of FIG. 2, and are similarly numbered. The data signal on line 62 is supplied to a data transition detector 100, and also to a random access memory (RAM) 102 as one bit of digital data which identifies the data as a bar or a space, as further described in FIG. 4. The transition detector 100 is coupled to a byte sequencer circuit 104 and also provides a clock to an address counter 106 and a reset to a data counter 108. The X-axis tach signal on line 48 is supplied to the byte sequencer circuit 104 and also as a clock to the data counter 108. The byte sequencer circuit 104 provides various control signals for synchronizing the loading of data, resetting the counter, and enabling the write function of the RAM 102 and, to this end, supplies latch control signals to a data latch 110 and to an address latch 112, and a write control signal to the RAM 102. The data counter counts the X-axis tach pulses which occur between successive data transitions, wherein a data transition occurs between each bar/space or space/bar.

FIGS. 3A–3D illustrate the signals generated by the bar code reader 34 as it scans bars and spaces in the interleaved 2 of 5 bar code technique exemplified herein, where information is contained in both the bars and spaces and inter-character spaces are eliminated. FIG. 3B depicts the output signal from the bar code reader 34 as it reads the series of bars and spaces depicted in FIG. 3A. Each bar and space defines a respective data cell. Each of the negative and positive going edges of the data signal are detected by the transition detector 100, which supplies a pulse for each transition as shown in FIG. 3C. The X-axis tach signal on line 48 is shown in FIG. 3D, wherein the number of tach pulses which occur during each of the wide or narrow bars or spaces between transition pulses, i.e., a data cell, is counted by the data counter 108. The transition detector 100 supplies a reset signal to clear the data counter 108, whereupon the data counter 108 accumulates the tach pulses which occur during a data cell, that is, until the transition detector 100 provides the next transition pulse. At this time, the byte sequencer circuit 104 latches the count in data latch 110, loads the count into the RAM 102 via a RAM write control signal. The data counter 108 is reset to zero in preparation for counting the tach pulses of the next data cell. The transition pulses from the transition detector 100 also clock the address counter through addresses corresponding to RAM locations for each of the data cells. The byte sequencer circuit 104 supplies the control signals to the address latch to latch and enable the address data to the RAM 102 for respective data cells.

In the 2 of 5 interleaved bar code used by way of example herein, there are 38 bars and spaces in a bar code symbol. Since each bar and space is a data cell, there also are 38 data cells in each symbol. It follows that there are 38 storage locations in the RAM 102 and corresponding addresses. Since the data counter 108 loads a count into the RAM 102 for each data cell, the RAM accumulates 38 data counts for each symbol, wherein each count equals a binary number representing either a wide or narrow bar or space. By way of example, if a wide bar or space has a distance between transitions of 30 X-axis pulses, and a narrow bar or space a distance of 10 X-axis pulses, then the RAM will store 38 binary values, wherein each value is equal to 30 counts for wide bars or spaces, and equal to 10 counts for narrow bars or spaces. In the system herein a preselected pulse count for representing a wide element lies in the range of 26 to 50 pulses, while a pulse count for the narrow element lies in the range of 5 to 25 pulses. Pulse counts above 50 or below 5 are considered invalid.

As further described below, at the beginning of the series of data cells there is included a status cell and a corresponding status location in RAM. The status cell is represented in part as a binary value equal to the number of transitions which should have accumulated during read out of a bar code symbol and which in this exemplary format is a fixed number of 38. In particular, the status byte contains the transition count in the first six bits D0 through D5, D6 is not used, and D7 carries forward/reverse information for the decoding process. Thus, the status cell byte is used prior to actually decoding the data cell information from RAM to insure that the correct number of transitions and thus data cells have been read and stored. If not, the information is discarded.

The information corresponding to a symbol is read from the RAM 102 in response to an interrupt fed to a microprocessor (FIG. 4) by the byte sequencer circuit 104, which informs the microprocessor that the data is ready in RAM 102. The status byte is first loaded into memory and is checked for the correct number of transitions. If correct, the data then is loaded into microprocessor memory for the subsequent decoding process, further described below in FIG. 10. The RAM 102 then is free to begin loading the data cell counts for the next bar code symbol.

FIG. 4 shows further details of the bar code reader system of FIG. 2, wherein similar components are similarly numbered. The data signal is supplied to a D-type flip-flop 114 via the line 62 from the bar code reader 34 (FIG. 1) in the form of a digital signal which varies, for example, from zero to 5 volts. The flip-flop 114 is clocked by the X-axis tach on the line 48 and provides a digital data signal at its Q output, and an inverted digital data signal at its Q-bar output, both of which are re-timed by the X-axis tach and represent the bars and spaces of the bar code symbol as respective logic levels. The Q output is coupled to one input of a window generator 116, and to the D7 bit position of the data latch 110 and provides a logic level identifying whether the data byte is a bar or a space. The Q-bar output is coupled to the transition detector 100 and to a second input of the window generator 116. The X-axis tach on line 48 is coupled to a third input of the window generator 16.

The transition detector 100 is formed of an exclusive OR circuit with a slight delay between inputs, which supplies a transition pulse for each transition between data cells to a 1-tach delay 118, to the clock input of the data latch 110, to a first transition inhibit circuit 120 and to the clock input of a transition counter 122. The 1-tach delay 118 is clocked by the X-axis tach and supplies a delayed transition signal, having a delay of one tach pulse, to reset the data counter 108 and to clock the address counter 106. The data counter 108 is clocked by an inverted X-axis tach from line 48.

The window generator 116 provides means for determining when the bar code reader 34 is approaching and leaving a bar code symbol and readies the associated circuits to load data. Referring briefly to FIG. 6, FIG. 6A depicts data from two successive bar code symbols 24 with a non-reflective area 124 between them as, for example, where the cassettes 22 are in the bins 20 with non-reflective spacings between them. The labels themselves are formed with white reflective "quiet zones", herein termed start and stop margins 126, 128, similar to the spaces in the bar code symbol but much longer, printed at either end of the bar code symbol. The start margin 126 identifies the start of a symbol while the stop margin 128 identifies the end of the symbol. The window generator 116, FIG. 4, is clocked by the varying period of the X-axis tach and thus can detect that the start margin 126 is much longer than a wide space, and thus that the reader 34 is approaching a bar code symbol. In turn, the window generator 116 brackets the symbol by generating start and stop window pulses immediately before and after the beginning and end of the bar code information and particularly at a point over one-half of the widths of the start and stop margins. The margin widths also vary inversely with the rate of scan. The window generator 116 is further described below with reference to FIGS. 5 and 6.

The window signal is supplied to a delay circuit 130, to the first transition inhibit circuit 120, and to the byte sequencer circuit 104 as an inverted window signal. The delay circuit 130 also is clocked by the X-axis tach and generates a first-tach-after-window signal which is fed to a direction circuit 132 and to the reset input of a transition flip-flop 134. The D input of flip-flop 134 is coupled to an output of the first transition inhibit circuit 120 to receive a signal which enables the transition counter 122; that is, its Q output provides the reset input to the transition counter 122.

A direction signal consisting of a high or low logic state indicative of scanning in the forward or reverse direction respectively, is supplied to the direction circuit 132 via the line 45 of previous mention from the X-axis servo 42. The direction signal also is supplied to the up/down input of the address counter 106 and to the D7 bit location of a transition latch 140, and provides to these components (and thus to the RAM 102) the direction in which the bar code reader 34 is reading the symbol. The direction circuit 132 supplies a forward signal to the reset input of the address counter 106 to reset the latter, and a reverse signal to the load input of the counter 106 to load the latter with the number 38 when reading the symbol backwards.

The first transition inhibit circuit 120 supplies a transition-minus-one signal to the byte sequencer circuit 104, wherein the first transition pulse after the window signal is deleted since no data has accumulated and there is no data to latch on the first transition. The circuit 120 also supplies an enable signal to an enable input of an input/output address latch 142 which couples an address bus of a microprocessor 144 to the address bus extending from the address latch 112 to the RAM 102. The first transition inhibit circuit 120 is essentially a pair of serial D-type flip-flops whose output is fed to the D input of the flip-flop 134, and also is AND'd with the transition signal to supply the transition-minus-one signal.

The byte sequencer circuit 104 also receives an inverted X-axis tach via the line 48. As previously mentioned, the byte sequencer circuit 104 coordinates the various loading and write functions associated with the RAM 102 and the transition counter 122/latch 140 wherein the transition count in the transition counter 122 is loaded into the RAM 102 via the transition latch 140 and an internal bus 141. The transition count is the status cell data of previous mention which is equal to the number of transitions which have accumulated. In the bar code format exemplified herein, the transition count should be 38 when scanning in the reverse direction, i.e., right to left, and 38 plus 128 when scanning in the forward direction and the D7 bit in transition latch 140 is high. The byte sequencer circuit 104 thus supplies respective control signals to; the output enable input of the data latch 110; the clock and output enable inputs of the address latch 112; the write enable input of the RAM 102; the clock and output enable inputs of the transition flip-flop 134 and the transition latch 140 respectively; the clock input of the latch 140 and an input of the direction circuit 130. The signal fed to the flip-flop 134 disables it and also loads the transition count of counter 122. In addition, the byte sequencer circuit 104 supplies a reset signal to itself and to the reset input of the first transition inhibit circuit 120, which reset signal also supplies the interrupt signal of previous mention on a line 146 to the microprocessor 144. The reset signal is AND'd with a Q4 output signal comprising a control bit from the microprocessor 144 via an input/output data latch 148. The latter couples the data bus extending between the data latch 110 and RAM 102 to the microprocessor 144 data bus for transfer of the bar code data stored in the RAM 102 after each bar code symbol scanning process.

The input/output data latch 148 receives an inverted write enable signal at its clock input via a line 152. The latter enable signal is supplied by the microprocessor 144 to control the data latch Q4 bit line to coordinate the RAM 102 reading process. The output enable input of the input/output data latch 148 receives a data request command from the microprocessor 144 via a line 154, which request command also is fed to the output enable input of the RAM 102 to unload the bar code data into the microprocessor memory.

FIG. 5 depicts an implementation of the window generator 116 of FIG. 4, wherein the X-axis tach is supplied on line 48 and the non-inverted and inverted data signals are supplied by the flip-flop 114. The tach clocks a first counter 160, and the inverted data is supplied to an OR gate 162. The second input to OR gate 162 is coupled to the Q8 output of the counter 160, and the OR'd output is coupled to the reset input of the counter. Thus the counter 160 is reset by either the data transitions or by its Q8 output. The Q7 output of the first counter 160 clocks a divide-by-two flip-flop 164, whose Q-bar output is coupled back to its D input. The Q-bar output of the flip-flop 164 also supplies the window signal pulses of previous mention which bracket the bar code symbol. To establish the phase of the window signal, the data transitions are supplied to a second counter 166 which is reset by the Q7 output of the first counter 160 via a NOR gate 161 and filter 163. The Q5 output of the second counter 166 is coupled via a filter 165 to the reset input of the divide-by-two flip-flop 164.

In operation and referring also to FIG. 6, as long as data appears at the OR gate 162, the first counter 160 is repeatedly cleared. When data stops, as when the bar code reader is scanning the start margin 126 of the label (FIG. 6A), the counter 160 is no longer reset and accumulates a large value of counts, for example, greater than 64 (a value much larger than the largest possible value 50 assigned as a wide space). This indicates that the reader 34 is scanning the start margin 126 and not a wide space, and is approaching a bar code symbol. The Q7 output of the first counter 160 goes high and clocks the divide-by-two flip-flop 164 (FIG. 6B). The counter 160 is reset again at the end of the start margin when data appears, and also at the end of the stop margin when the non-reflective area appears.

Since it is unknown whether a start or a stop margin is being approached, that is, whether the reading is in the forward or reverse direction, the second counter 166 counts data transitions. While a label is being read the counter 166 accumulates counts, but does not accumulate counts when the reader scans between labels. Thus when second counter 166 accumulates more than 16 counts (approaching one-half of the 38 transitions in this format) the circuit knows that the area being scanned is the bar code symbol and not either of the margins 126, 128 (FIG. 6D). The Q5 output of the second counter 166 supplies a reset to clear the flip-flop 164 to allow it to generate the corresponding start window signal as a high logic level (FIG. 6E). At the end of the symbol, after half of the stop margin is scanned, the counter 160 is reset and the stop window signal corresponding to the end of the window is clocked low.

FIG. 7 depicts an implementation of the byte sequencer circuit 104, which includes a data byte sequencer 168 and a status byte write sequencer 170. The inverted tach is supplied to AND gates 172, 174 in the sequencers 168, 170 respectively. The transition-minus-one signal from the first transition inhibit circuit 120 clocks a D-type flip-flop 176, whose Q output is coupled to the second input of AND gate 172. The latter clocks a shift register 178 which, in turn, supplies a series of data byte signals by shifting a high down the respective Q outputs. The Q0 output is coupled to an OR gate 180 and to the output enable input of the data latch 110 (FIG. 4B). The Q1 output is coupled to an OR gate 182, and the Q2 output is coupled to the reset inputs of itself and the flip-flop 176.

The inverted window signal from the window generator 116 clocks a flip-flop 184, whose Q output is coupled to the second input of the AND gate 174. The latter clocks a shift register 186 which, like shift register 178, supplies a series of status byte signals via respective Q outputs. The Q0 output is coupled to the direction circuit 132 and to the transition latch 140 clock input (FIG. 4A). The Q1 output is coupled to the second input of the OR gate 180 and to the clock and output enable inputs of the flip-flop 134 and latch 140 respectively (FIG. 4A). The Q2 output is coupled to the second input of the OR gate 182, and the Q3 output is coupled to the reset inputs of itself and of the first transition inhibit circuit 120 (FIG. 4A). The latter reset signal also is coupled to the AND gate which provides the interrupt signal to the microprocessor 144 (FIG. 4B). The OR gate 182 fires a one-shot multivibrator 183 to load either the status or data bytes in the RAM 102. The OR gate 180 supplies the transition-minus-one signal to the clock and output enable inputs of the address latch 112 to latch the address counts for the status or data bytes.

Thus, the data byte sequencer 168 is responsive to the transition-minus-one signal and the tach and provides control signals associated with data, while the status byte write sequencer 170 is responsive to the window signal and the tach and generates control signals associated with the status data. To this end, FIGS. 8A–8G depict the waveforms generated in the data byte sequencer 168 in response to the transition-minus-one signal which latches the address latch 112 data. On the next tach the shift register 178 clears the data counter 108, increments the address counter 106 (FIG. 8C) and the Q0 output of counter 178 enables the data latch 110 (FIG. 8D). One tach later, the Q1 output fires the one-shot 183 to enable loading the RAM 102 (FIGS. 8E, 8G). One tach later, the Q2 output resets the data byte sequencer 168 to ready it for the next data (FIG. 8F).

Likewise, in FIGS. 9A–9F the status byte write sequencer 170 waveforms are depicted, with the window signal and tach shown in FIGS. 9A, 9B. On the first tach after the window signal goes low, the Q0 output of the shift register 186 resets the address counter 106 and latches the transition data of transition counter 122 (FIG. 9C). One tach later, the Q1 output latches and enables the address data, enables the transition count data and disables the transition counter 122 (FIG. 9D). Another tach later, the Q2 output fires the write enable one-shot 182 to enable the RAM 102 write function (FIG. 9E). A further tach later, the Q3 output resets the status byte write sequencer 170 and also the first transition inhibit circuit 120 (FIG. 9F).

FIG. 10 depicts the flow chart for the decode program performed by the microprocessor 144 and is generally self-explanatory. Upon having accumulated the data and status byte counts for a symbol in the RAM 102, and in response to the interrupt and the request command from the microprocessor, the program begins and the status byte count first is loaded into the microprocessor memory. The status byte is checked to determine if the D7 bit thereof recovered via the transition latch 140, indicates a forward or reverse scan direction. The status byte count then is checked to insure the correct number of transitions were accumulated for the direction of scan, that is, 38 for the reverse and 166 for the forward directions. The data bytes then are sliced and each byte is checked to determine if it is outside the range of possible values of, for example, five to fifty, and if it is in the range of 5 to 25 (indicating a narrow element) or from 26 to 50 (indicating a wide element). The start and stop characters are checked and if correct, a parity check is made for all six digits of the data characters. If parities check, the digits are decoded and the 2 of 5 code is converted to binary code decimal numbers to obtain the symbol number. The latter is loaded into external system memory for subsequent use.

The invention has been described wherein the pulses indicative of optical scanner movement and used to remove the time dimension from the bar code read out technique are generated by a specific type of rotating tachometer device coupled to a translating scanner apparatus. However, the invention contemplates use with any pulse generating system wherein a stream of pulses are generated which represent the scanning speed of any bar code reading mechanism, whether it be optical, electrical, magnetic, etc., or whether it translates or rotates while reading the symbol. Thus, for example, in a hand-held wand bar code reader, the wand may include an odometer wheel in contact with the bar code label which generates pulses at a rate proportional to the speed of scanning performed by the operator. Likewise the invention may be used in systems where bar code symbols are translated past a stationary bar code reader mechanism at varying scan speeds.

Additionally, as in an NRZ encoded technique, a first data counter (such as counter 108) may be used to count the tach pulses between inter-character transitions, and a second data counter may then determine the number of tach pulses for the individual data cells of the data characters due to the known specific arrangement of bars/spaces of the 2 of 5 code. Likewise, a counter may be used to count tach pulses which occur between the start of data characters to the end of the data characters, i.e., to count the pulses over the symbol length in the manner described in the invention description herein. Thus, the invention contemplates use in systems wherein boundary pulses are generated in the course of reading bar code symbols with varying scanning speeds.

The concepts of the invention may be applied to a software environment in applications which do not require the high speed of operation of a hardware implemented system. For example, the stream of pulses with period defining the unit of measured distance are supplied via a tach data bus to the microprocessor along with the bar code data signal. The transitions indicative of bar/space or character boundaries may be generated via hardware or the microprocessor and the resulting data cells then are handled via the microprocessor memory essentially as described herein.

Although the invention specifically is exemplified herein reading bar code data at changing scan speeds, it obviously also provides readout at different constant scan speeds.

What is claimed is:

1. A method for reading bar code information at varied scanning speeds, wherein the information is contained in selected portions of the bar code, the portions being defined by respective transitions, comprising:
   generating the stream of pulses whose period is a unit measurement distance that is an inverse function of the scanning speed; and
   determining the number of pulses which occur within the unit measurement distance to identify the information.

2. The method of claim 1 including:
   supplying a preselected pulse count which represents the identity of the information; and
   comparing the determined number of pulses with the preselected pulse count to establish that the number of pulses represents the information.

3. The method of claim 1 wherein the portions comprise a plurality of wide and narrow bars in a bar code symbol, and the step of determining includes:
   detecting the transitions between successive bars in the bar code symbol; and
   counting the number of pulses which occur between successive transitions to establish whether the number of pulses represent wide or narrow bars.

4. The method of claim 3 including:
   supplying first and second pulse counts to represent wide and narrow bars respectively; and
   comparing the number of pulses which occur between successive transitions with the first and second pulse counts to determine whether the number of pulses represent wide or narrow bars.

5. The method of claim 3 including:
   providing a time window signal which determines when the bar code symbol is being scanned.

6. The method of claim 3 wherein the step of counting includes:
   enabling a counter to count the number of pulses which occur between successive transitions.

7. The method of claim 5 wherein the bar code symbol has a selected number of bars, including:
   accumulating the successive transitions in a bar code symbol to confirm that the correct number of transitions for the symbol have been obtained.

8. The method of claim 2 wherein boundaries define a character of the bar code information, the method including:
   determining the number of pulses which occur within the character boundaries at the changing scanning speed.

9. A method for reading a bar code symbol with changing scanning speed wherein information is contained in wide and narrow bars and spaces of the bar code symbol, comprising:
   generating a stream of pulses at a rate indicative of the scanning speed;
   detecting the transitions between bars and spaces; and
   determining the number of pulses which occur between transitions to establish whether the number of pulses correspond to wide or narrow bars and spaces.

10. The method of claim 9 wherein the step of determining includes:
    counting the number of pulses which occur between transitions to supply respective pulse count values;
    supplying first and second preselected pulse counts to represent wide or narrow bars and spaces respectively; and
    comparing the pulse count values with the first and second preselected pulse counts to determine whether the pulse count values represent wide or narrow bars or spaces.

11. The method of claim 10 including:
    storing the pulse count values of successive transitions as respective data counts for the bar code symbol;
    storing a binary signal indicative of whether the data counts represent bars or spaces; and
    comparing the successive data counts to determine if they represent wide or narrow bars or wide or narrow spaces.

12. The method of claim 10 including:
    determining the direction in which the bar code symbol is scanned at the changing speed; and
    decoding the sequence of the determined wide and narrow bars and spaces to supply the bar code symbol information.

13. The method of claim 9 including:
    detecting a start and stop margin prior to and after the bar code symbol; and
    providing a window signal upon detecting the start margin and terminating the window signal upon detecting the stop margin.

14. The method of claim 9 including:
    accumulating a status count of successive transitions in the bar code symbol to confirm that the correct number of transitions have been obtained for the respective symbol.

15. A system for recovering information encoded in a bar code symbol by scanning the latter with scanner means at scanning speed, said symbol containing data cells formed of wide and narrow bars whose scan distances in time are a function of the scanning speed, comprising:
    means for generating a stream of pulses whose period is a function of the relative rate of movement between the scanner means and the bar code symbol;
    means for representing the width of a data cell in terms of the number of pulses which occur therein; and
    means for establishing whether the number of pulses which occur during the data cell represent a wide or a narrow bar.

16. The system of claim 15 wherein the representing means includes:

means for providing transition pulses at the boundaries of successive data cells; and counter means for counting the number of pulses in the stream of pulses which occur between successive transition pulses to define first or second values of pulse counts corresponding to wide or narrow bars.

17. The circuit of claim 16 wherein the establishing means includes:

memory means for storing the successive first and second values of pulse counts representative of the width of respective data cells; and means for comparing if the first and second values of pulse counts represent that the bars are wide or narrow.

18. A system for recovering the information encoded in bars of a bar code symbol scanned by scanner means at a given speed, comprising:

means for generating a stream of pulses whose period is a function of the scanning speed;

means for detecting bar transitions;

means for counting the pulses which occur between successive transitions;

memory means for storing the successive count values obtained between successive transitions; and means for determining if the successive count values are indicative of wide or narrow bars.

19. The system of claim 18 including:

an optical scanner integral with the scanner means for supplying a bar code data signal;

tach means coupled to the optical scanner for generating tach pulses as a function of the scanner speed; and transition detector means coupled to the optical scanner for detecting the transitions in the bar code data signal.

20. The system of claim 19 wherein:

the counting means includes a data counter coupled to the tach means and responsive to the transition detector means for generating the successive count values between transitions; and the memory means includes a random access memory coupled to the data counter.

21. The system of claim 19 further including:

window generating means coupled to the optical scanner and responsive to the tach means for generating a window signal upon determining the optical scanner is approaching a bar code symbol.

22. The system of claim 21 wherein the window generating means includes:

a first counter which is continuously reset in the absence of the bar code data signal but accumulates a preselected number of tach pulses indicative of a margin area preceding the bar code symbol;

a second counter for accumulating a preselected number of transitions indicative of scanning the bar code symbol; and wherein the window generating means supplies window pulses which encompass the bar code data signal.

23. The system of claim 22 wherein:

the first counter is clocked by the tach pulses and reset by the transitions; and the second counter is clocked by the transitions in the data signal.

24. The system of claim 21 including:

sequencer means operatively coupled to the transition detector means and to the window signal generating means and responsive to the tach pulses for loading the number of transitions as a status byte and the successive count values as data bytes in the memory means 25. The system of claim 24 further including:

transition counter means coupled to the transition detector means and responsive to the sequencer means for counting the number of transitions in a bar code symbol and for loading the transition count into the memory means as the status byte.

26. The system of claim 25 including:

means for supplying a bit position in the status byte which is indicative of the direction of scanning.

27. The system of claim 24 wherein the sequencer means includes:

first shift register means operatively coupled to the transition detector means and responsive to the tach pulses for supplying a series of control signals at successive tach pulse times for selectively loading the count values into the memory means while resetting the counter means;

second shift register means operatively coupled to the window generating means and responsive to the tach pulses for supplying a series of control signals at successive tach pulse times for selectively loading the number of transitions into the memory means; and wherein the first and second shift register means latch an address count for the status and data bytes.

28. In a bar code reader/processor system having microprocessor means, wherein information is encoded in the specific sequence of wide and narrow bars and spaces of a bar code symbol, and wherein the symbol is scanned by scanner means to supply a data signal, a reading system comprising:

means for generating a stream of pulses whose period in time is a function of the relative rate of movement between the scanner means and bar code symbol;

means coupled to the scanner means for detecting bar/space and space/bar transitions in the data signal;

counter means for counting the number of pulses which occur between successive transitions;

memory means for storing the successive numbers of pulses counted during successive durations as data bytes; and means including the microprocessor means for determining if the stored data bytes represent wide or narrow bars or spaces.

29. The system of claim 28 wherein:

the pulse generating means includes a tachometer coupled to sense the rate of scanning movement between the scanner means and the bar code symbol; and the detecting means includes a transition detector coupled to receive the data signal for supplying transition pulses at the respective boundaries of the bars and spaces.

30. The system of claim 29 wherein:

the counter means includes a counter clocked by the tachometer and loaded and cleared by the transition detector; and said counter having one bit position which identifies whether the number of pulses counted is a bar or a space.

31. The system of claim 28 including:

window generator means coupled to the detecting means and responsive to the pulse generating means for providing a window period which encompasses the length of the bar code symbol.

32. The system of claim 31 including:

sequencer circuit means coupled to the detecting means and to the window generator means for selectively loading the number of transitions and the data bytes into the memory means in response to the pulse generating means.

33. The system of claim 32 including:

transition counter means coupled to the detecting means for supplying the number of transitions as a status byte to the memory means in response to the sequencer circuit means; and means for supplying a bit position in the status byte which is indicative of the direction of scanning.

34. A system for identifying cassettes in a multiple cassette X,Y bin array, the apparatus including bar code symbols on each cassette for identifying same, an optical scanner movable in X-axis and Y-axis directions for supplying bar/space data signals associated with each of the cassettes as they are scanned in the X-axis direction by the optical scanner at a changing speed, comprising:

tach means for supplying X-axis tach pulses indicative of the rate of optical scanner movement past a cassette in the X-axis direction;

means coupled to the optical scanner for detecting transitions in the bar/space data signals;

counter means coupled to the tach means for providing data bytes representing the numbers of X-axis tach pulses which occur between successive transitions and also whether the respective data byte corresponds to a bar or a space;

memory means coupled to the counter means for storing successive data bytes;

means coupled to the memory means for determining if the data byte is a bar or space and for determining the respective widths of the bars and spaces represented by the data bytes; and means for decoding the sequence of the bar and space widths to identify the respective cassette.

35. The system of claim 34 including:

window generator means coupled to receive the bar/space data signals from the optical scanner and responsive to the tach means for generating a window signal which indicates the approach and end of a bar code symbol.

36. The system of claim 34 including:

transition counter means coupled to the transition detecting means for accumulating the number of detected transitions and the direction of scan as a status byte; and said memory means including a first storage location for the status byte.

37. The system of claim 36 wherein:

a wide bar or space is represented by a first plurality of tach pulses and a narrow bar or space is represented by a second lesser plurality of tach pulses; and the determining means first determines if the number of transitions in the status byte is correct and then compares the successive data bytes to determine if a value corresponds to the first or second plurality of tach pulses.

38. The system of claim 36 including:

sequencer circuit means coupled to the window generator means and to the transition detecting means and responsive to the tach means for loading the status byte and the data bytes into the memory means, for clearing the counter means, and for latching an address count for the status and data bytes.

* * * * *

UNITED STATES PATENT AND TRADEMARK OFFICE
CERTIFICATE OF CORRECTION

PATENT NO.  : 4,751,375
DATED       : June 14, 1988
INVENTOR(S) : Raymond F. Ravizza It is certified that error appears in the above-identified patent and that said Letters Patent is hereby corrected as shown below:

Column 3, line 31, after "picker" insert -- drive circuits.--

Column 3, line 38, change "tne" to --the--

Column 8, line 47, change "16" to --116--

Column 14, line 2, omit "changing"

Column 14, line 54, after "at" insert --given--

Signed and Sealed this

Twenty-first Day of February, 1989

Attest:

DONALD J. QUIGG

*Attesting Officer*   *Commissioner of Patents and Trademarks*